United States Patent Office 3,281,478
Patented Oct. 25, 1966

3,281,478
PHENOLS, A PROCESS FOR THE PREPARATION THEREOF AND PRODUCTS PRODUCED THEREFROM
Alford G. Farnham, Mendham, N.J., assignor to Union Carbide Corporation, a corporation of New York
No Drawing. Filed Jan. 25, 1962, Ser. No. 168,830
6 Claims. (Cl. 260—619)

This invention relates to phenols, to a process for the preparation thereof, and to products produced therefrom. More particularly, this invention relates to a process for the cleavage of dihydric, polynuclear phenols to produce mono- or polyhydric phenols.

Cleavage of dihydric, polynuclear phenols has been accomplished in the past by heating the desired dihydric, polynuclear phenol at elevated temperatures, generally on the order of about 160° C. in the presence of an acidic condensing agent. As an illustration, heating 2,2-bis-(4-hydroxyphenyl)propane at temperatures on the order of about 160° C. in the presence of an acidic condensing agent results in the theoretical formation of p-isopropenyl phenol. This and other comparable processes, however, have been found to be undesirable as the yield of the desired phenol has been relatively low due to the occurrence of undesirable side reactions. For example, under conditions which alkenyl phenols, such as p-isopropenyl phenol, are currently produced by the cleavage of the corresponding dihydric, polynuclear phenols, the alkenyl phenols self-condense through their olefinic bonds immediately upon formation to produce undesirable mixtures of polymeric compounds.

The present invention in one of its aspects provides for the cleavage of a dihydric, polynuclear phenol to form the corresponding monohydric phenol. In its broadest aspect, the process of the present invention by which a dihydric, polynuclear phenol is cleaved to form the corresponding monohydric phenol, is conducted by heating the dihydric, polynuclear phenol in contact with an alkaline catalyst and at a temperature and under a pressure such that the monohydric phenol is distilled over.

As a rule, the dihydric, polynuclear phenols are cleaved to the corresponding monohydric phenols by being heated, in contact with an alkaline catalyst, at temperatures on the order of about 150° C. to about 300° C. under a pressure of about 5 mm. of Hg to about 30 mm. of Hg.

The alkaline catalysts, which are described subsequently, are generally used in catalytic amounts, that is, in amounts sufficient to promote the cleavage of the dihydric, polynuclear phenol. Usually, the amount used is from about 0.5 to about 10 and preferably about 0.5 to about 2 percent by weight based on the weight of the dihydric, polynuclear phenol.

Illustrative of dihydric, polynuclear phenols which are cleaved to the corresponding monohydric phenols are those compounds having the general formula:

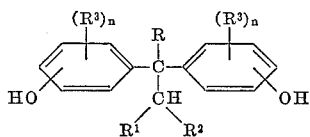

wherein R, $R^1$, $R^2$ and $R^3$ are as defined subsequently, $n$ is an integer having a value of 0 to 4 inclusive and each hydroxyl group is in a position other than meta with respect to the linking group which links together the aromatic groups.

As stated, the monohydric phenols are recovered as a distillate on heating the desired dihydric, polynuclear phenol in accordance with the present invention.

The present invention, in another one of its aspects, provides for the preparation of mono and trihydric phenols in their crystalline form and to a process for their preparation in satisfactory yields in relatively short periods of time and without the undesirable formation of polymeric products.

The crystalline, trihydric phenols of the present invention have the general formula:

Formula I

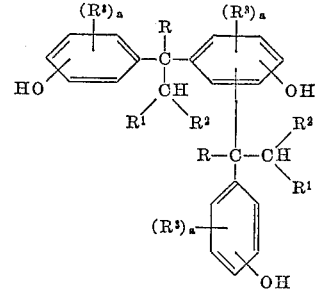

wherein: R, $R^1$ and $R^2$, which can be the same or different, are hydrogen or alkyl, and when alkyl generally containing from 1 to 4 carbon atoms inclusive, and preferably containing from 1 to 2 carbon atoms inclusive, as for example, methyl, ethyl, n-propyl, isopropyl, n-butyl and the like; each individual $R^3$ which on the same nucleus can be the same or different but are the same with respect to corresponding $R^3$'s on other nuclei are halogen atoms such as chlorine, bromine, iodine or fluorine, or alkyl, and when alkyl generally containing from 1 to 4 carbon atoms inclusive, and preferably containing from 1 to 2 carbon atoms inclusive, as illustrated by methyl, ethyl, n-propyl, isopropyl, n-butyl and the like; and $a$ is an integer having a value of 0 to 3 inclusive, and with the further limitation that each hydroxyl group is in a position other than meta with respect to the linking group

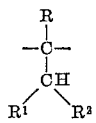

which links one aromatic group to another. Particularly desirable triphenols for purposes of this invention are those crystalline products having the general formula:

Formula II

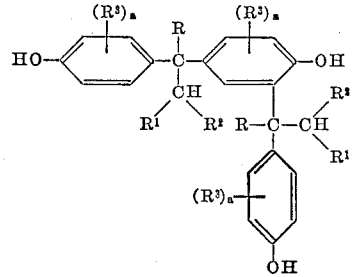

wherein R, $R^1$, $R^2$, $R^3$ and $a$ are as defined.

The monohydric phenols of the present invention are the crystalline, alkenyl phenols having the general formula:

Formula III

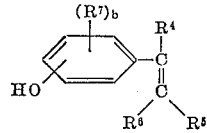

wherein $R^4$, $R^5$ and $R^6$, which can be the same or different, are as defined for R; each individual $R^7$, which can be the same or different, are as defined for $R^3$, $b$ is an integer having a value of 1 to 4 inclusive and the hydroxyl group is in a position other than meta with respect to the alkenyl group. Particularly desirable alkenyl phenols for purposes of this invention are those crystalline products having the general formula:

Formula IV

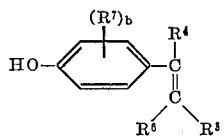

wherein $R^4$, $R^5$, $R^6$ and $b$ are as defined and each individual $R^7$ is halogen.

Triphenols falling within the scope of Formula I are prepared by cleaving, in the presence of an alkaline catalyst, at dihydric, polynuclear phenol which has the general formula:

Formula V

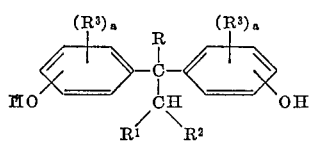

wherein R, $R^1$, $R^2$, $R^3$ and $a$ are as previously defined, the position of OH with respect to the linking group

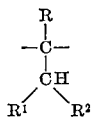

is as previously defined, and wherein at least one position meta to the linking group is unsubstituted. Particularly desirable for purposes of this invention are dihydric, polynuclear phenols which have the general formula:

Formula VI

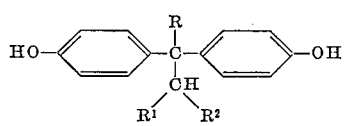

wherein R, $R^1$ and $R^2$ are as previously defined.

Illustrative of dihydric, polynuclear phenols which can be cleaved to produce the triphenols of this invention are the following:

1,1-bis-(2-hydroxyphenyl)ethane,
1,1-bis-(4-hydroxyphenyl)ethane,
2,2-bis-(4-hydroxyphenyl)propane,
1,1-bis-(4-hydroxyphenyl)butane,
1,1-bis-(3-methyl-4-hydroxyphenyl)propane,
2,2-bis-(3-ethyl-2-hydroxyphenyl)propane,
2,2-bis-(2-chloro-4-hydroxyphenyl)butane, and the like.

In its broadest aspect, the process of the present invention, by which the triphenols are produced, is conducted by heating a dihydric, polynuclear phenol falling within the scope of Formula V in contact with an alkaline, catalyst at a temperature and under a pressure such that the distillate recovered is composed primarily of phenol in those instances wherein an unsubstituted dihydric, polynuclear phenol is being heated; and an alkyl or halogen substituted phenol in those instances wherein an alkyl or halogen substituted dihydric, polynuclear phenol is being heated.

Generally, dihydric, polynuclear phenols are cleaved to form trihydric phenols by being heated, in contact with an alkaline catalyst, at a temperature in the range of about 150° C. to about 195° C. and preferably at a temperature in the range of about 175° C. to about 195° C. and under a pressure of about 5 mm. of Hg to about 30 mm. of Hg and preferably under a pressure of about 5 mm. of Hg to about 20 mm. of Hg.

At temperatures lower than about 150° C., under the pressures noted, little, if any, dihydric, polynuclear phenol is cleaved to form the corresponding trihydric phenol. Heating a dihydric, polynuclear phenol at temperatures greater than about 195° C., under the pressures noted, also results in little, if any, trihydric phenol being formed.

The reaction which results in the formation of a trihydric phenol in accordance with the present invention can be illustrated by the following equation wherein the dihydric, polynuclear phenol cleaved and the triphenol formed are represented by general formula:

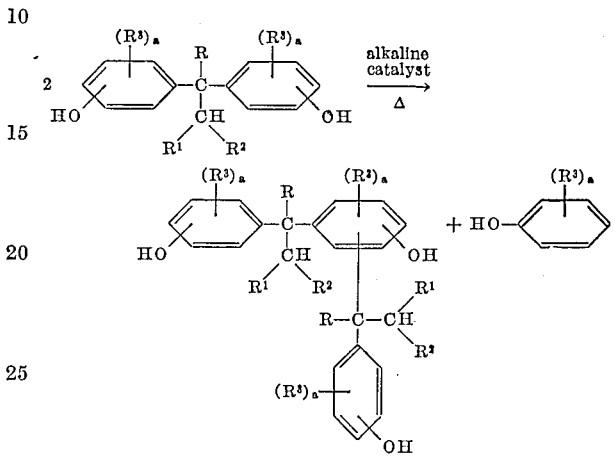

wherein R, $R^1$, $R^2$, $R^3$ and $a$ are as previously defined and the position of each OH with respect to the linking group is as defined.

The heating operation by which the dihydric, polynuclear phenol is cleaved is conducted until the theoretical amount of monohydric phenol has distilled over. Theoretically, at the conclusion of the reaction one mole of phenol has distilled over for every two moles of dihydric, polynuclear phenol heated. The actual time of the heating cycle will, of course, vary and depend upon the particular dihydric, polynuclear phenol which is being cleaved.

Generally, the heating process by which the dihydric, polynuclear phenols are cleaved is conducted under an inert gas atmosphere. Suitable gases for this purpose are nitrogen and argon.

The trihydric phenols which are obtained at the conclusion of the heating cycle can, if desired, be further treated in order to insure removal therefrom of catalyst residue and any dihydric, polynuclear phenol which has remained uncleaved. This can be conveniently accomplished by crystallizing the trihydric phenol in a suitable solvent such as acetic acid and distilling the resultant crystalline product, removing the dihydric, polynuclear phenol as the distillate. The trihydric phenol, recovered as the distilland, can then be recrystallized from any suitable solvent, if so desired. Suitable solvents for this purpose are: toluene, aqueous acetic acid and the like.

As stated, cleavage of dihydric, polynuclear phenols is accomplished with the phenols being in contact with an alkaline catalyst. Any alkaline catalyst which is theoretically capable of reacting with the dihydric, polynuclear phenol to generate a phenoxide ion is suitable.

Illustrative of suitable alkaline catalysts are basic compounds, that is, compounds which in admixture with water provide an aqueous medium which has a pH of greater than 7. Exemplary of such are compounds of alkali metals, e.g., lithium, sodium, potassium rubidium and cesium, and compounds of alkaline earth metals, e.g., calcium, strontium and barium. Among such compounds can be noted the alkali metal oxides such as lithium oxide, sodium oxide, potassium oxide and the like; the alkali metal hydroxides such as lithium hydroxide, sodium hydroxide, potassium hydroxide and the like; the alkali metal carbonates such as lithium carbonate, sodium carbonate, potassium carbonate and the like; alkali metal phenoxides such as lithium phenate, sodium phenate, potassium phenate, as well as the alkali metal salts of the dihydric, polynuclear phenols noted under Formula IV; the alkaline earth metal oxides such as calcium oxide, strontium oxide, barium hydroxide and the like; the alkaline earth metal carbonates such as calcium carbonate, strontium carbonate, barium carbonate and the like; the alkaline earth metal phenoxides such as calcium phenate, strontium phenate, barium phenate and the like, as well as the alkaline earth metal salts of the dihydric, polynuclear phenols noted under Formula V.

The alkaline catalysts are used in catalytic amounts, that is, in amounts sufficient to promote the cleavage of the dihydric, polynuclear phenol. As a rule the amount used is from about 0.5 to about 10 and preferably about 0.5 to about 2 percent by weight of the dihydric polynuclear phenol.

Preparation of the monohydric, alkenyl phenols of this invention is accomplished by cleaving a dihydric, polynuclear phenol falling within the scope of Formula VII below by heating the phenol at a temperature and under a pressure such that the alkenyl phenol is distilled over. Generally, the phenol falling within the scope of Formula VII is heated at a temperature of about 200° C. to about 300° C. and preferably at a temperature of about 200° C. to about 250° C. under a pressure as defined for the preparation of the triphenols of this invention and while the phenol is in contact with an alkaline catalyst as previously defined and in the amounts as previously defined.

The conditions under which the dihydric, polynuclear phenol is heated, the time of the heating cycle with respect to the preparation of the alkenyl phenols is the same as that described with respect to the preparation of the trihydric phenols. Recovery of the alkenyl phenol from a distillate containing, in addition to the alkenyl phenol, phenol or a halo or alkyl substituted phenol is conveniently accomplished by fractional distillation and recovery of the alkenyl phenol fraction. This fraction is then cooled to room temperature, about 23° C., to a crystalline product.

Formula VII

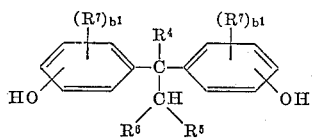

wherein $R^4$, $R^5$, $R^6$, $R^7$ are as previously defined, $b^1$ is an integer having a value of 0 to 4 inclusive and HO is in a position other than meta to the group linking the aromatic groups.

The reaction which results in the formation of a monohydric, alkenyl phenol, in accordance with the present invention, can be illustrated by the following equation wherein the dihydric, polynuclear phenol being cleaved and the monohydric, alkenyl phenol formed are represented by general formula.

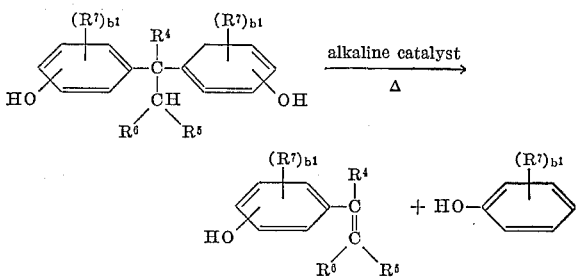

wherein $R^4$, $R^5$, $R^6$, $R^7$ and $b^1$ are as previously defined and the OH group is in a position other than meta with respect to the alkenyl group.

The crystalline, triphenols of the present invention can be reacted with an epichlorohydrin, in the presence of an alkaline catalyst to produce the corresponding triglycidyl ethers having the general formula:

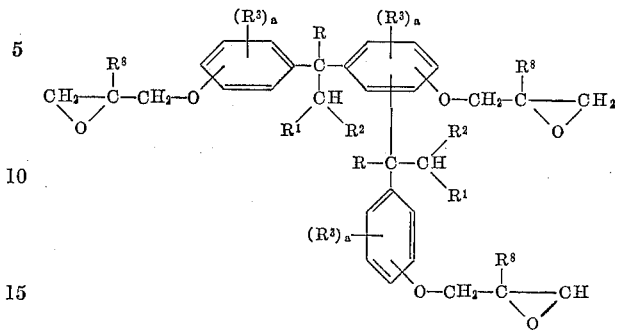

wherein R, $R^1$, $R^2$ and $R^3$ are as previously defined and $R^8$ is hydrogen or methyl and each glycidyl ether group is attached to its aromatic group in a position other than meta to the linking group, linking the aromatic groups one to another.

Exemplary of suitable epihalohydrins that can be reacted with the crystalline, triphenols to produce the corresponding triglycidyl ethers can be noted the epihalohydrins of the formula:

Formula VIII

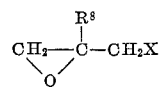

wherein $R^8$ is as defined and X is a halogen such as chlorine or bromine.

In conducting the reaction between an epihalohydrin and trihydric phenol, various amounts of the reactants can be employed. Generally, the amount of an epihalohydrin employed will be at least one mole per each OH equivalent of the trihydric phenol, and preferably from about 3 to about 4 moles of an epihalohydrin per OH equivalent. More than about 4 moles of an epihalohydrin per OH equivalent can be used, but this results in little improvement in the yield of triglycidyl ether.

The reaction between an epihalohydrin and a trihydric phenol is usually carried out utilizing a catalyst which provides an alkaline medium for the reaction. As a rule, the catalysts used serve a dual purpose. Initially, they serve to catalyze the reaction of an epihalohydrin with the trihydric phenol to form the corresponding halohydrin ether and subsequently, they serve to dehydrohalogenate the chlorohydrin ether to the corresponding triglycidyl ether.

For a detailed discussion of suitable procedures to be used in conducting the reaction between an epihalohydrin and a trihydric phenol, including a discussion of suitable catalysts, suitable reaction temperatures and the like, reference is made to U.S. Patent 2,943,045 to A. G. Farnham et al.

The triglycidyl ethers of this invention can be cured to infusible products using any of the epoxide curing agents.

Curing agents are generally classified as hardeners, that is, curing agents which themselves react with the triglycidyl ethers; or are classified as catalysts, that is, curing agents which promote the self-reaction of the triglycidyl ethers.

When used, the hardener is present in amounts of from about 75 percent of stoichiometric to about 15 percent in excess of stoichiometric and preferably from about 90 percent of stoichiometric to about 10 percent in excess of stoichiometric, with respect to the amount of triglycidyl ether used.

In those instances wherein the curing agent used is a catalyst, the catalyst is used in amounts of from about 0.2 to about 5 percent by weight, preferably from about 0.5 to about 2 percent by weight, based on the weight of the triglycidyl ether. More than about 5 percent by weight of catalyst can be used but this does not materially decrease the time of the curing cycle of the compositions and is therefore economically undesirable. Typical hardeners are amines of the formula:

Formula IX 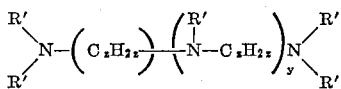

wherein $y$ is an integer from zero to 3 inclusive, $z$ is an integer from 2 to 6 inclusive, R' in each instance is a monovalent substituent being either hydrogen or a hydroxyalkyl group wherein the alkyl group preferably contains from 2 to 4 carbon atoms inclusive, as for example, hydroxyethyl and hydroxypropyl, the hydroxyalkyl groups in any molecule not necessarily being the same, and the number of instances per molecule wherein R' represents a hydroxyalkyl group being a whole number which is at least one, but less than $y+2$.

Typical hydroxyalkyl alkylene polyamines coming within the scope of the above structural formula are the following: N-hydroxyethyl ethylenediamine, N-hydroxyethyl pentamethylenediamine, N-hydroxypropyl tetramethylenediamine, N-hydroxyethyl diethylenetriamine, N,N-dihydroxyethyl diethylenetriamine, N,N''-dihydroxyethyl diethylenetriamine, N-hydroxypropyl diethylenetriamine, N,N-dihydroxypropyl diethylenetriamine, N,N''-dihydroxypropyl diethylenetriamine, N-hydroxyethyl propylenediamine, N-hydroxypropyl propylenediamine, N-hydroxyethyl dipropylenetriamine, N,N-dihydroxyethyl dipropylenetriamine, N,N'-dihydroxyethyl dipropylenetriamine, tris-hydroxyethyl triethylenetetramine and the like.

Preparation of hydroxyalkyl alkylene polyamines is described in U.S. Patent 2,901,461 to V. Auerbach et al.

Other suitable polyamine hardeners include, among others, the adducts formed in reacting at temperatures of about 0° C. to about 150° C. a polyamine having Formula IX, previously noted or a polyamine of the formula:

Formula X 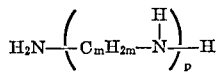

wherein $m$ has a value of from 2 to 10 inclusive, preferably from 2 to 6 inclusive and $p$ has a value of from 1 to 6 inclusive, preferably 1 to 4 inclusive, with at least about 0.5 mole and preferably from about 0.5 to about 2.0 moles, per mole of amine, of an acrylate of the formula:

Formula XI 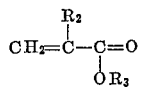

wherein $R_3$ is an alkyl radical, preferably containing from 1 to 18 carbon atoms inclusive; $R_2$ is either hydrogen or an alkyl radical containing from 1 to 2 carbon atoms inclusive.

Among suitable polyamines falling within the scope of Formula X are: 1,2-diaminoethane, 1,3-diaminopropane, 1,4-diaminobutane, 1,5-diaminopentane, 1,6-diaminohexane, 1,8-diaminooctane, 1,9-diaminononane, 1,10-diaminodecane, diethylenetriamine, triethylenetetramine, tetraethylenepentamine, dipropylenetriamine and the like. Illustrative of acrylates coming within the purview of Formula XI which can be reacted with the polyamines to produce the amine-acrylate adducts are the following: methylacrylate, ethylacrylate, n-propylacrylate, isopropylacrylate, n-butylacrylate, n-amylacrylate, n-hexylacrylate, 2-ethylhexylacrylate, n-octylacrylate, n-nonylacrylate, n-laurylacrylate, n-pentadecylacrylate, n-octadecylacrylate, methylmethacrylate, methylethacrylate, isopropylmethacrylate, n-hexylmethacrylate, n-nonylmethacrylate, ethylethacrylate, n-butylethacrylate, n-amylethacrylate, n-hexylethacrylate, 2-ethylhexylethacrylate, n-octadecylethacrylate and the like.

In addition to the amines noted, other suitable amine hardening agents are: 2-aminoethanol, 2-aminopropanol, 3-aminobutanol, 1,3-diamino-2-propanol, m-aminophenol, p-aminophenol, 4,4'-methylene dianiline, m-phenylene diamine, diethylenetriamine and the like.

For purposes of stoichiometric calculations with respect to amines, one aminohydrogen atom is deemed to react with one epoxy group; as to amino phenols, stoichiometry is based on replaceable hydrogen atoms, that is, aminohydrogens and hydrogens of the hydroxyl groups.

Exemplary of other suitable hardening agents are the polyhydric phenols such as catechol, hydroquinone, hydroxyhydroquinone, chloroglucinol, resorcinol and pyrogallol; the di- or poly-nuclear phenols such as the bisphenols described in Bender et al., U.S. Patent 2,506,486 and polyphenylols such as novolak condensates of a phenol and a saturated or unsaturated aldehyde containing an average of from 3 to 20 or more phenylol groups per molecule (cf. book by T. S. Carswell entitled "Phenoplasts," published in 1947 by Interscience Publishers of New York). Examples of suitable polyphenylols derived from a phenol and an unsaturated aldehyde such as acrolein, are the triphenylols, pentaphenylols and heptaphenylols described in U.S. Patent 2,885,385 to A. G. Farnham.

The phenols may contain alkyl or aryl ring substituents or halogens, as exemplified by the alkyl resorcinols, the tribromo resorcinol and the diphenols containing alkyl and halogen substituents on the aromatic ring (Bender et al., U.S. Patent 2,506,486).

The polyhydric polynuclear phenols can consist of 2 or more phenols connected by such groups as methylene, alkylene, ether, ketone or sulfone. The connecting groups are further exemplified by the following compounds: bis(p-hydroxyphenyl)ether, bis(p-hydroxyphenyl)ketone, bis(p-hydroxyphenyl)methane, bis(p-hydroxyphenyl)dimethyl methane, bis(p-hydroxyphenyl)sulfone and the like.

For purposes of stoichiometric calculations with respect to phenols, one hydroxy group is deemed to react with one epoxy group.

In addition to the hardening agents previously listed, polycarboxylic acids and anhydrides thereof can also be employed. Among suitable polycarboxylic acids are those of the formula:

Formula XII $\quad HOOC-(CH_2)_f-COOH$ wherein $f$ is an integer generally having a value of from 1 to 20 inclusive, as for example, malonic, succinic, glutaric, adipic, pimelic, suberic, azelaic, sebacic and the like. Other examples of suitable acids are phthalic acid, isophthalic acid, terephthalic acid and the like, as well as the anhydrides of the acids noted above. Further acids which can be used as hardening agents are enumerated in U.S. Patent 2,918,444 to B. Phillips et al.

For purposes of stoichiometric calculations with respect to acids and anhydrides thereof, one carbonyl group is deemed to react with one epoxy group.

As previously stated, in those instances wherein catalysts are used, they are generally employed in amounts of from about 0.2 to about 5 percent by weight based on the weight of the triglycidyl ether. As examples of suitable catalysts are the metal halides exemplified by boron trifluoride, stannic chloride, zinc chloride, ferric chloride and the like, as well as the etherates and amine complexes of such metal halides.

The cured products of the triglycidyl ethers of the present invention have relatively high heat distortion temperatures and are especially desirable for use as potting compositions for electrical components.

The crystalline, alkenyl phenols of this invention can also be reacted with epihalohydrins falling within the scope of Formula VIII to produce monoglycidyl ethers having the formula:

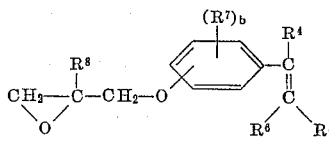

wherein $R^4$, $R^5$, $R^6$, $R^7$, $R^8$ and $b$ are as previously defined and the position of the glycidyl ether group is other than meta to the alkenyl group.

The preparation of the monoglycidyl ethers of the alkenyl phenols can be effected in a manner as described for the preparation of the triglycidyl ethers.

The alkenyl phenols of this invention can be polymerized with one or more vinyl monomers, that is, monomers containing the group

to produce thermoplastic polymers. Illustrative of such monomers are: vinyl aryls such as styrene, o-methoxystyrene, p-methoxystyrene, m-methoxystyrene, o-nitrostyrene, m-nitrostyrene, o-methylstyrene, p-methylstyrene, m-methylstyrene, p-phenylstyrene, o-phenylstyrene, m-phenylstyrene, vinylnaphthalene and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-di-methylacrylamide, methacrylamide, N-methyl methacrylamide, N,N-dimethyl methacrylamide, acrylonitrile, chloroacrylonitrile, methacrylonitrile, ethacrylonitrile and the like; alkyl esters of maleic and fumaric acid such as dimethyl maleate, diethyl maleate and the like; vinyl alkyl ketones such as methyl vinyl ketone, ethyl vinyl ketone, isobutyl vinyl ketone and the like; also vinyl pyridine, N-vinyl carbazole, N-vinyl pyrrolidine, ethyl methylene malonate and the like.

Polymerization of the alkenyl phenols with the vinyl monomers to produce thermoplastic polymers is accomplished by simply admixing the monomers and heating on the order of about 80° C. to about 90° C. in the absence or in the presence of an azo compound which serves as a catalyst.

It is to be noted that all patents and references noted in this application are incorporated herein by reference.

The following examples illustrate the present invention and are not intended to limit the scope thereof in any manner.

*Example 1*

This example illustrates alkaline cleavage of 2,2-bis-(p-hydroxyphenyl)propane to form phenol and a triphenol having the formula:

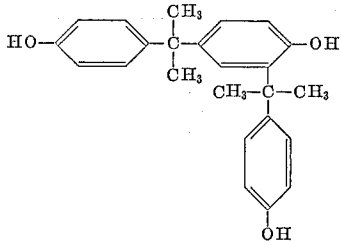

Into a flask equipped with a stirrer, thermometer and an 18-inch helices packed distillation column, there was placed 684 grams of 2,2-bis-(p-hydroxyphenyl)propane. The 2,2-bis-(p-hydroxyphenyl)propane was melted by being heated, under a blanket of nitrogen gas, at a temperature of 190° C. To the melted 2,2-bis-(p-hydroxyphenyl)propane, there was added 10.9 grams of anhydrous, disodium salt of 2,2-bis-(p-hydroxyphenyl)propane and the resultant mixture stirred and heated at a temperature of 180° C. to 190° C. under a pressure of 8–9 mm. of Hg for one hour. During this latter heating operation, 146 grams of phenol distilled (identified by freezing point).

The residue which remained in the flask, 541 grams, was poured into a pan and cooled to room temperature, about 23° C., to a brittle solid. One hundred grams of the brittle solid were dissolved in a mixture of 200 cc. of toluene and 5 cc. of acetic acid, stirred and allowed to stand overnight. The crystals which had formed were recovered by a filtration operation, washed with toluene and dilute aqueous acetic acid and dried to constant weight. Thirty-nine grams of product (crystals) were obtained, melting in the range of 138° C. to 173° C. The crystals were distilled under vacuum with the result that the 2,2-bis-(p-hydroxyphenyl)propane fraction was separated from the triphenol residue.

The 2,2-bis-(p-hydroxyphenyl)propane fraction was recovered as a distillate boiling at a temperature of 175° C. to 205° C. under a pressure of 0.5 mm. of Hg.

Twenty-two and three-tenths grams of the triphenol residue were recovered and recrystallized from toluene yielding 20 grams of the triphenol having a melting point of 191° C. to 193° C. Percent yield of crystalline triphenol based on the weight of 2,2-bis-(p-hydroxyphenyl) propane charged was 20 percent.

Analysis for the trihydric phenol:

Melting point=192° C.–193° C.
Boiling point=240° C.–245° C. under a pressure of 0.25 mm. of Hg
Molecular weight=found, 362; calculated, 362
Hydroxyl value=found, 13.4%; calculated, 14.1%

*Example 2*

This example illustrates alkaline cleavage of 2,2-bis-(p-hydroxyphenyl)propane to form phenol and a triphenol having the formula:

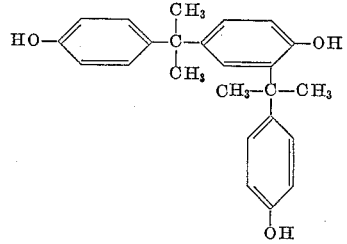

Into a flask equipped with a stirrer and thermometer, there was placed 456 grams of 2,2-bis-(p-hydroxyphenyl) propane. The 2,2-bis-(p-hydroxyphenyl)propane was melted by being heated, under a blanket of nitrogen gas, at a temperature of 190° C. To the melted 2,2-bis-(p-hydroxyphenyl)propane there was added 10.9 grams of anhydrous, disoduim salt of 2,2-bis-(p-hydroxyphenyl) propane and the resultant mixture was stirred and heated at a temperature of 185° C. to 195° C. under a pressure of 8–9 mm. of Hg until 90 cc. of phenol had distilled over (identified by freezing point). The residue which remained in the flask was poured into a pan and cooled to room temperature, about 23° C., to a brittle solid. The brittle solid was dissolved in a mixture of 500 cc. of toluene and 10 cc. of acetic acid, stirred and allowed to stand overnight. The crystals which had formed were recovered by a filtration operation yielding 231 grams of product which melted at a temperature of 140° C. to 160° C. The product (crystals) were recrystallized first from a mixture of acetic acid and water (60 parts by weight of acetic acid and 40 parts by weight water) and then from toluene. The 2,2-bis-(p-hydroxyphenyl)propane was separated from the triphenol in a manner as described in Example 1.

The triphenol, obtained in an amount of 98.9 grams, had a melting point of 191° C. to 193° C. Percent yield of triphenol based on the weight of 2,2-bis-(p-hydroxyphenyl)propane charged was 26.5 percent.

*Example 3*

This example illustrates alkaline cleavage of 2,2-bis-(p-hydroxyphenyl)propane to form phenol and isopropenyl phenol having the formula:

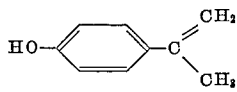

Into a flask equipped with a stirrer and thermometer, there was placed 684 grams of 2,2-bis-(p-hydroxyphenyl)propane. The 2,2-bis-(p-hydroxyphenyl)propane was melted by being heated, under a blanket of nitrogen gas, at a temperature of 190° C. To the melted 2,2-bis-(p-hydroxyphenyl)propane, there was added 10.9 grams of anhydrous, disoduim salt of 2,2-bis-(p-hydroxyphenyl)propane and the resultant mixture stirred and heated under a pressure of 23 mm. of Hg and at a pot temperature of about 200° C.–220° C. until 642 grams of distillate were collected. The yellowish distillate was fractionally distilled under a helices packed column at a pressure of 15 mm. of Hg with the result that 280 grams of phenol (colorless distillate) were recovered (identified by freezing point).

The yellowish, viscous, liquid residue was distilled, without using a column, and 322 grams of distillate were recovered in a receiver which was at a temperature of about 0° C. The white crystals which formed, isopropenylphenol, had a melting point of 84° C.

Infrared analysis of the white crystals was consistent with the isopropenylphenol structure.

*Example 4*

This example illustrates alkaline cleavage of 2,2-bis-(3,5-dichloro-4-hydroxyphenyl)propane to form 2,6-dichlorophenol and 2,6-dichloro-4-isopropenylphenol having the formula:

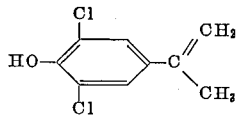

Into a flask equipped with a thermometer, and distillation column, there was placed 500 grams of 2,2-bis-(3,5-dichloro-4-hydroxyphenyl)propane and 4 grams of sodium phenate. This mixture was heated, under a nitrogen gas atmosphere, at a temperature of 230° C. to 253° C. and under a pressure of 10 mm. of Hg for 2.5 hours. At the end of this time, 4 grams of sodium phenate were added to the contents of the flask and heating continued for another 2.5 hours under the conditions described in the preceding sentence. At the end of the heating operation, total of 5 hours, 411 grams of distillate had been collected.

The distillate was fractionally distilled under a pressure of 10 mm. of Hg using a helices packed column. Each fraction recovered and the amount thereof was as follows:

| Fraction | Conditions | Amount, grams | Composition of— |
|---|---|---|---|
| 1st | 95° C.–97° C., 10 mm. of Hg. | 157 | 2, 6-dichlorophenol. |
| 2d | 139° C., 10 mm. of Hg | 159 | 2,6-dichloro-4-isopropenylphenol. |

The 2,6-dichlorophenol fraction was recrystallized from cyclohexane yielding purified 2,6-dichlorophenol white crystals melting at 66° C.

The 2,6-dichloro-4-isopropenyl phenol fraction was purified by refractionation yielding crystalline 2,6-dichloro-4-isopropenylphenol.

Analysis (2,6-dichloro-4-isopropenylphenol) percent chlorine: found, 34.3; calculated, 34.95.

The structure of 2,6-dichloro-4-isopropenylphenol was confirmed by infrared analysis.

*Example 5*

This example illustrates alkaline cleavage of 1,1-bis-(p-hydroxyphenyl)-2-methylpropane to form phenol and isobutenyl phenol having the formula:

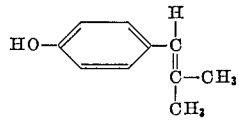

Into a flask equipped with a thermometer, and distillation column, there was placed 300 grams of 1,1-bis-(p-hydroxyphenyl)-2-methylpropane and 3 grams of potassium phenate. This mixture was distilled under a nitrogen gas atmosphere and under a pressure of 5 mm. of Hg for 2 hours at a temperature of 205° C. to 250° C. At the end of the two-hour period, 246 grams of distillate were recovered.

The distillate was fractionally distilled under a pressure of 10 mm. of Hg using a helices packed column. Each fraction recovered and the amount thereof was as follows:

| Fraction | Conditions | Amount, grams | Composition |
|---|---|---|---|
| 1st | 73° C., 10 mm. of Hg | 121 | Phenol. |
| 2d | 132° C., 10 mm. of Hg | 80 | Isobutenylphenol. |

The isobutenyl phenol was cooled to room temperature, about 23° C., to crystals. The melting point of the isobutenyl phenol produced as 56° C.

*Example 6*

This example illustrates the preparation of monoglycidyl ether of 2,6-dichloro-4-isopropenylphenol having the formula:

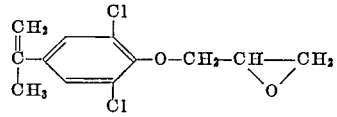

A mixture of 406 grams of 2,6-dichloro-4-isopropenylphenol, 740 grams of epichlorohydrin and 260 grams of ethyl alcohol was heated to a temperature of about 55° C. to about 60° C. and 50 percent aqueous sodium hydroxide was added thereto with stirring at the following rate:

|  | Grams |
|---|---|
| First 15-minute period | 5.7 |
| Second 15-minute period | 11.4 |
| Third 15-minute period | 22.8 |
| Fourth 15-minute period | 45.6 |
| Fifth 15-minute period | 67.5 |

The mixture was heated for another 25 minutes at a temperature of 55° C.–60° C. after the fifth addition of the sodium hydroxide and then the organic layer was decanted from the brine layer. Eighteen grams of sodium hydroxide (50% by weight aqueous solution) were then added to the organic layer while the temperature of the organic layer was maintained at about 55° C. to about 60° C., after which 5 grams of water were added thereto. The mixture was allowed to settle and the aqueous layer drawn off. The organic layer was then heated to 70° C. under a pressure of about 20 mm. of Hg with the result that the ethyl alcohol and excess epichlorohydrin were distilled off. The monoglycidyl ether product was then dissolved in toluene and the toluene solution washed with water. The toluene solution was distilled, removing the toluene as the distillate, under a pressure of 15 mm. of Hg to a residue temperature of 110° C. The yield of monoglycidyl ether of 2,6-dichloro-4-isopropenyl phenol was practically quantitative.

*Example 7*

This example illustrates the preparation of the triglycidyl ether of the trihydric phenol of Example 1.

Example 6 was repeated using in lieu of 2,6-dichloro-4-isopropenylphenol, 241 grams of the trihydric phenol of Example 1.

The epoxide equivalent weight of the triglycidyl ether produced was 190 grams per gram equivalent epoxy group.

*Example 8*

This example illustrates the preparation of a thermoplastic polymer from styrene and 2,6-dichloro-4-isopropenylphenol.

Thermoplastic polymers were prepared by placing the desired monomers in a test tube and heating the admixed monomers. Monomers, conditions under which the monomers were polymerized and the results of the polymerization are noted in the table below.

| Amount of Monomer Used | Polymerization Temperature, °C. | Time, hrs. | Catalyst | Percent by Weight Conversion of Monomers | Percent by Weight Combined Monomer | Reduced Viscosity [1] |
|---|---|---|---|---|---|---|
| TUBE 1 | | | | | | |
| 33.5 parts by weight 2,6-dichloro-4-isopropenylphenol, 66.45 parts by weight styrene. | 65 | 120 | 0.05 parts by wt. azobisisobutyronitrile. | 17 | 34.6 (2,6-dichloro-4-isopropenylphenol), 65.4 (styrene). | 0.25 |
| TUBE 2 | | | | | | |
| 17.8 parts by weight 2,6-dichloro-4-isopropenylphenol, 82.2 parts by weight styrene. | 83 | 120 | None | 30 | 21 (2,6-dichloro-4-isopropenylphenol), 79 (styrene). | 0.25 |

[1] Reduced viscosity measurements were made at 23° C. in benzene.

What is claimed is:

1. Process for the preparation of a trihydric phenol which comprises heating, in contact with an alkaline catalyst, a dihydric, polynuclear phenol having the formula:

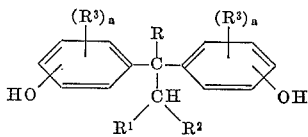

wherein R, $R^1$ and $R^2$ are selected from the group consisting of hydrogen and alkyl containing 1 to 4 carbon atoms inclusive, each $R^3$ is selected from the group consisting of halogen and alkyl containing 1 to 4 carbon atoms inclusive, and $a$ is an integer having a value of 0 to 3 inclusive, each OH group is in a position other than meta to the linking group, linking together the aromatic groups and wherein at least one position meta to the linking group is unsubstituted, at a temperature of about 150° C. to about 195° C. under a pressure of about 5 mm. of Hg to about 30 mm. of Hg whereby said polynuclear phenol is cleaved to form the corresponding triphenol.

2. Process as defined in claim 1 wherein the alkaline catalyst is selected from the group consisting of basic compounds of alkali metals and alkaline earth metals.

3. Process as defined in claim 1 wherein the said alkaline catalyst is disodium salt of 2,2-bis-(p-hydroxyphenyl)propane.

4. Process as defined in claim 1 wherein said polynuclear phenol has the formula:

$$HO-\underset{\underset{\underset{R^1}{\diagdown}\underset{R^2}{\diagup}}{C}}{\overset{R}{\underset{|}{C}}}-OH$$

wherein R, $R^1$ and $R^2$ are as defined in claim 1.

5. Process as defined in claim 1 wherein said dihydric, polynuclear phenol is heated under a pressure of about 5 mm. of Hg to about 20 mm. of Hg.

6. Process as defined in claim 1 wherein said dihydric, polynuclear phenol is heated at a temperature of about 175° C. to about 195° C. under a pressure of about 5 mm. of Hg to about 20 mm. of Hg.

References Cited by the Examiner

UNITED STATES PATENTS

| | | | |
|---|---|---|---|
| 2,002,447 | 5/1935 | Deichsel | 260—623 |
| 2,324,438 | 7/1943 | Castan | 260—47 |
| 2,382,475 | 8/1945 | Gisvold | 260—619 |
| 2,467,171 | 4/1949 | Werner et al. | 260—348 |
| 2,497,503 | 2/1950 | Jones | 260—619 X |
| 2,668,807 | 2/1954 | Greenlee | 260—47 |
| 2,682,547 | 6/1954 | Clemens et al. | 260—348 |
| 2,698,868 | 1/1955 | Evans | 260—624 |
| 2,833,830 | 5/1958 | Rigterink | 260—623 |
| 2,849,325 | 8/1958 | Lincoln | 260—619 X |
| 2,933,474 | 4/1960 | Handy et al. | 260—62 |
| 2,979,534 | 4/1961 | Petropoulos et al. | 260—621 |
| 3,058,953 | 10/1962 | McMaster | 260—47 |
| 3,094,508 | 6/1963 | Butterworth et al. | |

LEON ZITVER, *Primary Examiner.*

LEON J. BERCOVITZ, DANIEL D. HORWITZ, *Examiners.*

T. D. KERWIN, D. D. HELFER, *Assistant Examiners.*

UNITED STATES PATENT OFFICE
CERTIFICATE OF CORRECTION

Patent No. 3,281,478                         October 25, 1966

Alford G. Farnham

It is hereby certified that error appears in the above numbered patent requiring correction and that the said Letters Patent should read as corrected below.

Column 5, line 4, for "hydroxide" read -- oxide --; same line 4, after "like" insert -- the alkaline earth metal hydroxides such as calcium hydroxide, strontium hydroxide, barium hydroxide and the like --; column 7, line 37, for "in" read -- on --; column 11, lines 32 and 33, for "isoprophenylphenol" read -- isopropenylphenol --.

Signed and sealed this 5th day of September 1967.

(SEAL)
Attest:

ERNEST W. SWIDER                          EDWARD J. BRENNER
Attesting Officer                            Commissioner of Patents